United States Patent [19]

Seki et al.

[11] Patent Number: 5,360,842

[45] Date of Patent: Nov. 1, 1994

[54] NON-ASBESTOS FRICTION MATERIAL

[75] Inventors: Katsuji Seki, Washinomiya; Truong V. Hung, Hanyu, both of Japan

[73] Assignees: Akebono Brake Industry Co., Ltd., Tokyo; Akebono Research and Development Centre Ltd., Hanyu, both of Japan

[21] Appl. No.: 559

[22] Filed: Jan. 4, 1993

Related U.S. Application Data

[63] Continuation of Ser. No. 784,583, Oct. 29, 1991, abandoned.

[30] Foreign Application Priority Data

Dec. 27, 1990 [JP] Japan .................................. 2-418883

[51] Int. Cl.$^5$ ........................ C08K 11/00; C08K 3/26; C08K 3/34; C08J 5/14
[52] U.S. Cl. ..................................... 524/15; 524/425; 524/443; 523/149; 523/150; 523/152; 523/155
[58] Field of Search ................. 524/15, 431, 433, 435, 524/425, 443; 523/149, 150, 152, 155

[56] References Cited

U.S. PATENT DOCUMENTS

| | | | |
|---|---|---|---|
| 2,767,150 | 10/1956 | Harvey | 524/15 |
| 3,959,194 | 5/1976 | Adelmann | 260/17.2 |
| 4,012,350 | 3/1977 | Burke, Jr. et al. | 524/510 |
| 4,125,496 | 11/1978 | McGinnis | 524/9 |
| 4,137,214 | 1/1979 | Sochalski | 524/15 |
| 4,145,223 | 3/1979 | Iwata | 106/36 |
| 4,313,869 | 2/1982 | Littlefield | 524/63 |
| 4,374,211 | 2/1983 | Gallagher et al. | 523/156 |
| 4,388,423 | 6/1983 | Kaufman et al. | |
| 5,087,642 | 2/1992 | Seki et al. | 523/156 |

FOREIGN PATENT DOCUMENTS 0000840  2/1979  European Pat. Off. .

Primary Examiner—Paul R. Michl
Assistant Examiner—LaVonda R. Dewitt
Attorney, Agent, or Firm—Oblon, Spivak, McClelland, Maier & Neustadt

[57] ABSTRACT

A non-asbestos friction material containing friction dust comprising a composite of inorganic compound with polymerization product of cashew nut shell oil is disclosed. The material is used for the brake lining, disc pad and clutch facing for cars and industrial machinery.

6 Claims, 1 Drawing Sheet

NON-ASBESTOS FRICTION MATERIAL

This application is a continuation of application Ser. No. 07/784,583, filed on Oct. 29, 1991, now abandoned.

BACKGROUND OF THE INVENTION

The present invention relates to a non-asbestos friction material used for the brake lining, disc pad, clutch facing, etc. for cars and industrial machinery.

In said friction material for cars and industrial machinery, solid lubricant is usually formulated in consideration of the stability of friction coefficient and the wear resistance. As these solid lubricants, organic friction dust and inorganic lubricants such as graphite and molybdenum disulfide have been used so far.

For this organic friction dust, it is common to use particles obtainable by polymerizing cashew nut shell oil and particles obtainable by vulcanizing elastic polymers such as rubber. By mixing these with friction material, adequate elasticity is given to the friction material and, as a result, the friction characteristics are stabilized, since the contact area of friction surfaces increases through the elastic deformation on engaging with partner component of friction. Namely, the action of this organic friction dust is considered that, through the fluid or gas lubrication by low-molecular organic ingredients produced by depolymerization due to the frictional heat, the friction characteristics at low temperature is stabilized.

There is a problem, however, that, since the thermal decomposition products become too much and the lubrication becomes excessive at high temperature, so-called fade phenomenon, the friction coefficient being abruptly decreased, is caused resulting in an increased wear, too. Namely, the defect of the organic friction dust of this type lies in only the fade phenomenon, thus, with the friction materials put now into practice, the fade phenomenon and the wear at high temperature are suppressed as low as possible in consideration of the stability of friction characteristics to realize on a balance of both.

In practice, however, there has been a limit for this as long as the organic friction dust is used.

As a result of extensive investigations in view of this situation, a non-asbestos friction material, with which said problem is solved, has been developed according to the invention.

SUMMARY OF THE INVENTION

The invention is characterized by providing a non-asbestos friction material containing a composite of stratified inorganic compound or fibrous inorganic compound with polymerization product of cashew nut shell oil.

DETAILED DESCRIPTION OF THE INVENTION

Figure 1:
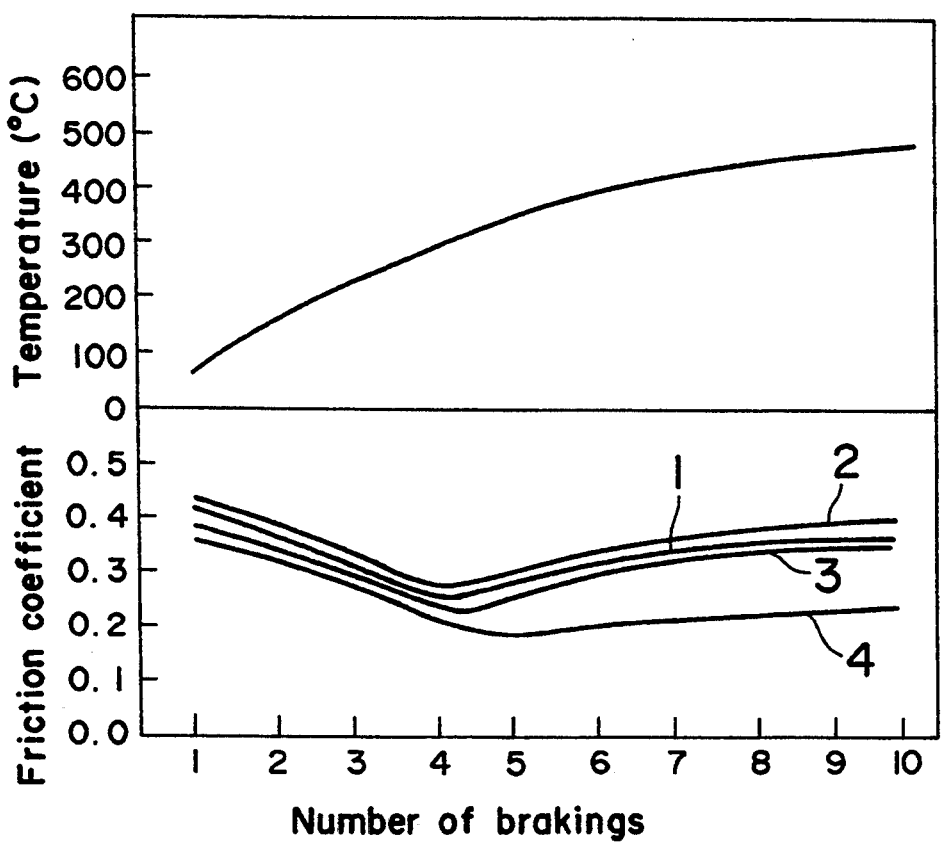
FIG. 1 is a chart showing results of the fade test of the inventive friction materials and the conventional friction material.

As described, by making the polymerization product of cashew nut shell oil as an organic friction dust a composite with inorganic compound, the proportion of organic ingredient decreases, thereby the amount of decomposed gas at high temperature decreases to improve the fade phenomenon.

Yet, though the reason is not evident, stratified foamed material such as vermiculite is more effective as a stratified inorganic compound and ceramic wool such as slag wool and calcium carbonate whisker etc. are more effective as fibrous inorganic compounds. The polymerization product of cashew nut shell oil is effective within a range of 5 to 95% and the stratified inorganic compound or fibrous inorganic compound within a range of 95 to 5%. The optimal level is 40 to 95% for the polymerization product of cashew nut shell oil and 60 to 5% for ths stratified inorganic compound or fibrous inorganic compound.

In following, the invention will be illustrated based on the examples.

EXAMPLE

The polymerization product of cashew nut shell oil and the slag wool, calcium carbonate whisker or vermiculite as a fibrous inorganic compound or stratified inorganic compound were mixed at weight ratios shown in Table 1. Further, after 10% curing agent such as hexamine or furfural to the weight of polymerization product of cashew nut shell oil were added to each mixture, the whole was heated to cure. Thereafter, this cured product was pulverized to a fixed particle size with pulverizer to obtain composite dusts A through F.

Next, as shown in Table 2, these composite dusts A through F were formulated with other materials to make the inventive friction materials ① through ⑥ according to the usual method. It is only necessary to formulate these composite dusts to friction materials in amounts of 3 to 30 wt. %, preferably 5 to 20 wt. %. Besides, for comparison, the conventional friction material ⑦ formulated with conventional resin dust in place of said composite dusts was also prepared.

TABLE 1

| Composite dust | A | B | C | D | E | F |
|---|---|---|---|---|---|---|
| Polymerization product of cashew nut shell oil | 70 | 50 | 70 | 50 | 70 | 50 |
| Slag wool | 30 | 50 | — | — | — | — |
| Vermiculite | — | — | 30 | 50 | — | — |
| Calcium carbonate whisker | — | — | — | — | 30 | 50 |

TABLE 2

| Formulating material | Inventive friction ① | Inventive friction ② | Inventive friction ③ | Inventive friction ④ | Inventive friction ⑤ | Inventive friction ⑥ | Conventional friction ⑦ |
|---|---|---|---|---|---|---|---|
| Composite dust | A, 15 | B, 15 | C, 15 | D, 15 | E, 15 | F, 15 | — |
| Phenol resin | 13 | Same as left | Same as left | Same as left | Same as left | Same as left | Same as left |
| Resin dust | — | — | — | — | — | — | 15 |
| Barium | 30 | Same as left | Same as left | Same as left | Same as left | Same as left | Same as left |

TABLE 2-continued

| Formulating material | Inventive friction ① | Inventive friction ② | Inventive friction ③ | Inventive friction ④ | Inventive friction ⑤ | Inventive friction ⑥ | Conventional friction ⑦ |
|---|---|---|---|---|---|---|---|
| Copper powder | 10 | Same as left | Same as left | Same as left | Same as left | Same as left | Same as left |
| Graphite | 15 | Same as left | Same as left | Same as left | Same as left | Same as left | Same as left |
| Ceramic | 2 | Same as left | Same as left | Same as left | Same as left | Same as left | Same as left |
| Aramid fibers | 5 | Same as left | Same as left | Same as left | Same as left | Same as left | Same as left |
| Potassium titanate fibers | 10 | Same as left | Same as left | Same as left | Same as left | Same as left | Same as left |

Figures indicate % by weight.

Of said respective friction materials, change in friction coefficient as a function of the number of brakings was examined using full-size dynamometer for the fade test according to JASO, the results of which are shown in FIG. 1. Moreover, of said friction materials, the wear test by temperature was carried out under the condition of N=1000 stop and the friction coefficient and the wear level were measured. Results are shown in Table 3.

TABLE 3

| | | Friction material | | | | | | |
|---|---|---|---|---|---|---|---|---|
| Item | Temperature °C. | Inventive friction ① | Inventive friction ② | Inventive friction ③ | Inventive friction ④ | Inventive friction ⑤ | Inventive friction ⑥ | Convential friction ⑦ |
| Wear | 100 | 0.12 | 0.10 | 0.13 | 0.10 | 0.12 | 0.10 | 0.15 |
| level | 300 | 0.22 | 0.25 | 0.23 | 0.28 | 0.30 | 0.27 | 0.40 |
| μm | 500 | 0.55 | 0.77 | 0.62 | 0.89 | 0.90 | 0.80 | 1.13 |
| Friction | 100 | 0.40 | 0.41 | 0.39 | 0.39 | 0.39 | 0.41 | 0.40 |
| coef- | 300 | 0.38 | 0.39 | 0.39 | 0.38 | 0.37 | 0.39 | 0.35 |
| ficient | 500 | 0.35 | 0.37 | 0.36 | 0.38 | 0.37 | 0.35 | 0.32 |

As evident from FIG. 1, it can be seen that all of the inventive friction materials ① through ⑥ (line segments 1 through 3 in diagram) have the minimum friction coefficient at the time of fade being higher by 0.05 to 0.1 than that of the conventional friction material ⑦ (line segment 4 in diagram). Moreover, from Table 3, it is seen that the inventive friction materials show decreased wear and increased friction coefficient at high temperatures of 300° C. and 500° C. in all cases.

As described, in accordance with the invention, composite dust provided with both elasticity and adequate lubrication was obtained by compositing the organic friction dust with inorganic material. The invention therefore exerts conspicuous effect to provide the nonasbestos friction material with which the problem of balance between fade phenomenon and high-temperature wear on braking of cars etc. was solved at a stroke.

What is claimed is:

1. A non-asbestos friction material, comprising an effective amount of a composite friction dust to result in high-temperature wear-resistance and reduced fading, wherein said composite friction dust is prepared by mixing 5 to 95% by weight of one or more inorganic compounds with 5 to 95% by weight of a polymerization product of cashew nut shell oil, adding an effective amount of a curing agent to the mixture and then curing by heating the mixed product, and then pulverizing the cured product to a desired particle size, and wherein said one or more inorganic compounds are selected from the group consisting of stratified vermiculite, fibrous ceramic wool and calcium carbonate whiskers; and further wherein said composite dust comprises 3 to 30% by weight of total formulating ingredients.

2. The non-asbestos friction material of claim 1 wherein said composite dust comprises 5 to 20% by weight of total formulating ingredients.

3. The non-asbestos friction material of claim 1, wherein said composite dust comprises the polymerization product of cashew nut shell oil in an amount of 50 to 70% by weight.

4. The non-asbestos friction material of claim 1, wherein said composite dust comprises stratified vermiculite in an amount of 30 to 50%.

5. The non-asbestos friction material of claim 1, wherein fibrous ceramic wool is slag wool.

6. The non-asbestos friction material of claim 5, wherein said composite dust comprises slag wool in an amount of 30 to 50% by weight.

* * * * *